Figure 1:
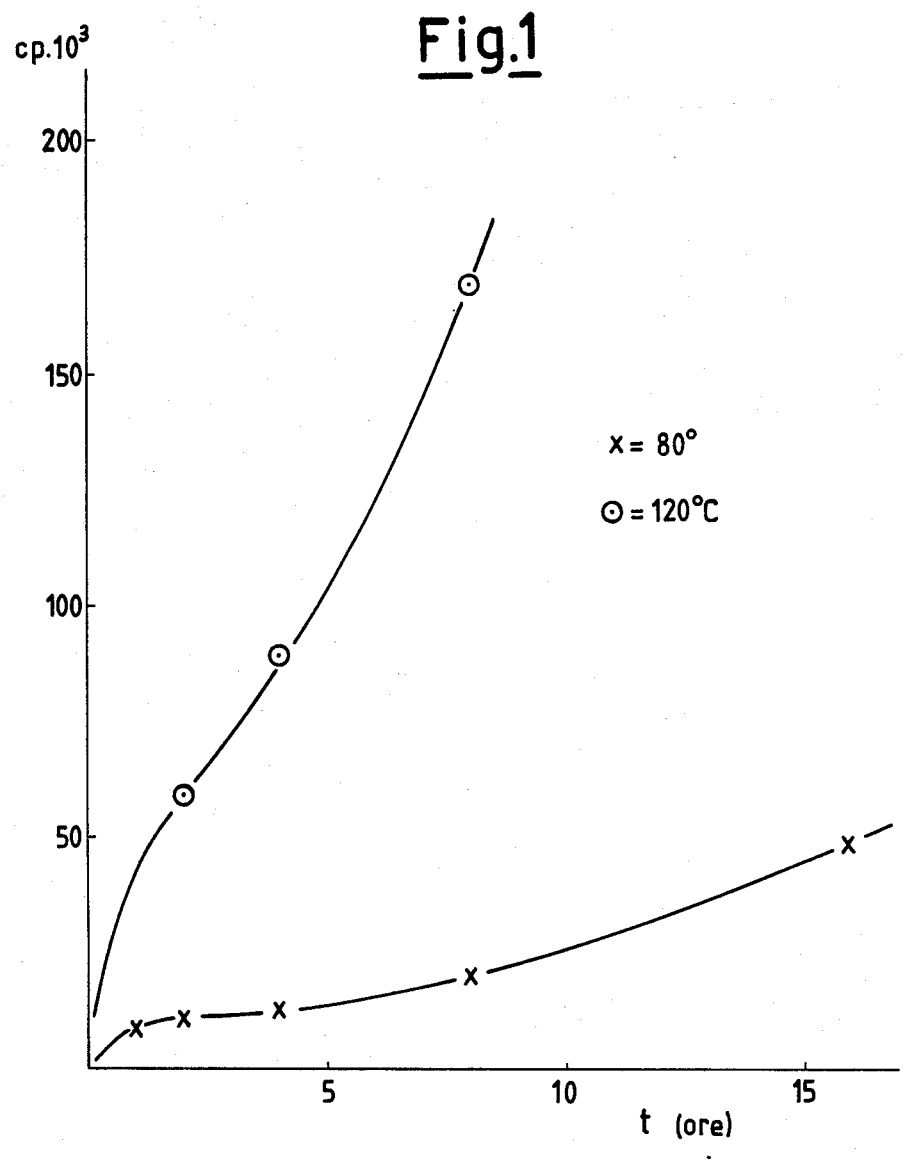

United States Patent [19]
Greco et al.

[11] Patent Number: 4,518,766
[45] Date of Patent: May 21, 1985

[54] POLYOXYALKYLENEDIOL-α,ω-BISALLYL POLYCARBONATE USEFUL AS A BASE FOR SEALANTS AND PROCESS FOR ITS PREPARATION

[75] Inventors: Alberto Greco, Milan; Guglielmo Bertolini, Pavia, both of Italy

[73] Assignee: Enichimica Secondaria, S.p.A., Palermo, Italy

[21] Appl. No.: 576,869

[22] Filed: Feb. 3, 1984

[30] Foreign Application Priority Data

Feb. 11, 1983 [IT] Italy ............... 19532 A/83

[51] Int. Cl.$^3$ .............................................. C08G 63/62
[52] U.S. Cl. .................................... 528/370; 525/410; 525/539; 526/314; 528/25; 528/29; 528/371; 528/425
[58] Field of Search .............. 528/425, 370, 371, 25, 528/29; 526/314; 525/539, 410

[56] References Cited

U.S. PATENT DOCUMENTS 4,398,008  8/1983  Misura .................... 526/314

*Primary Examiner*—Harold D. Anderson
*Attorney, Agent, or Firm*—Hedman, Gibson, Costigan & Hoare

[57] ABSTRACT

For preparing polyoxyalkylenediol-α,ω-bisallyl policarbonates, diallyl carbonate is reacted in a first reaction stage with a polyoxyalkylenediol having a mol wt between 400 and 4500 in the presence of a transesterification catalyst at a temperature in the neighborhood of 100° C. and under reduced pressures, whereafter, in a second reaction stage, the product as obtained from the first stage is treated at a temperature between 70° C. and 150° C. under reduced pressures, still in the presence of a transesterification catalyst. By so doing, the chain extension of the bisallyl carbonate of the polyoxyalkylenediol is achieved, whereas the unreacted diallyl carbonate coming from the first stage, and that produced in the second stage, are eliminated, and the final reaction product can thus be collected.

22 Claims, 2 Drawing Figures

Fig.2
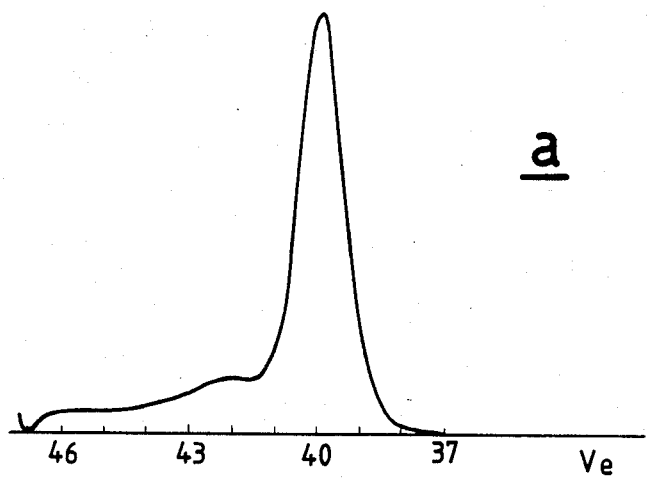
a
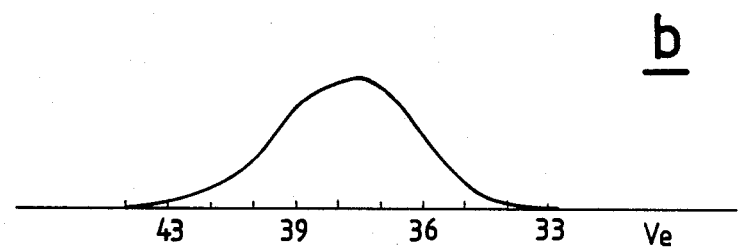
b
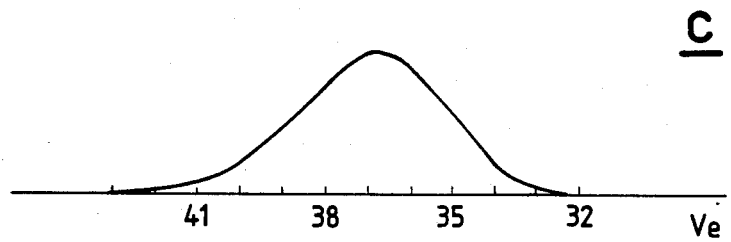
c

POLYOXYALKYLENEDIOL-α,ω-BISALLYL POLYCARBONATE USEFUL AS A BASE FOR SEALANTS AND PROCESS FOR ITS PREPARATION

This invention relates to a polycarbonate of polyoxyalkylenediol-α,ω-bisallyl useful as a base for sealants and the process for its preparation. The invention also relates to the sealants obtained by functionalization, especially with organic compounds of silicon, of such polycarbonate of polyoxyalkylenediol-α,ω-bisallyl. Substances of an elastomeric nature which have an allyl function at the chain end and which retain fluidity properties under the environmental conditions, are appreciated since they can be functionalized, especially with reactive silane groups, thus originating elastomeric materials which are capable of being cross-linked under the environmental conditions. In this connection, reference is invited to the following literature: I.Bela, J. P. Kennedy, V. S. C. Chang, J. Polymer Sc., 118 (A), 3177, (1980).

Polyoxyalkylenediols in general and polyoxypropylenediols more particularly, having a molecular weight of less than about 15,000, are products which are fluid at room temperature, and have a viscosity which varies from that of a mobile liquid to that of a tacky mass. On account of their elastomeric properties, such polyoxyalkylenediols have a potential use in forming a base for sealants, provided that a satisfactory bihydroxyl functionality is required (a condition which is vital in order to obtain a correct bisallyl functionality) the highest molecular weights should be over about 6,000, that is in the range in which said polyoxyalkylenediols still retain an adequate fulidity at room temperature and exhibit their best elastomeric properties.

It is known, that polyoxyalkylenediols, due to a scission transfer with the monomer during the synthesis stage, cannot be obtained with a molecular weight over about 6,000 and, moreover, they are obtained with difficulty in a molecular weight range of from under 6,000 to about 4,000, that which often occurs at the expense of a correct bihydroxyl functionality.

To overcome this drawback, the U.S. Pat. No. 3,971,751 has suggested that alkoxides of alkali metals be used to convert the terminal hydroxyl groups of the polyoxyalkylenepolyols having a molecular weight in the lower ranges and to extend their chains by reacting them with an organic halogen-substituted compound such as bichloromethane. It is thus possible to obtain compounds having a molecular weight in the higher ranges having hydroxyl groups at the chain ends, which are converted into allyl groups, the latter being functionalized by organic compounds of silicon.

The most prominent shortcomings of such a procedure are the potential hazard due to the use of an alkali metal, the difficulty of maintaining a correct stoichiometric relationship between the alkali metal and the hydroxyls of the polyoxyalkylenepolyol and the use of a solvent especially an etheral solvent. A solvent must be used because the bulk reaction between the polyoxyalkylenepolyol and the alkali metal results in a solid mass which cannot be processed.

According to the British Pat. No. 1,058,385 bisallyl carbonates are prepared, which are useful as sealant bases, by functionalizing with allyl chloroformate a polyoxyalkylenediol with an allyl chloroformate.

The cited patent however, does not convey any teaching as to the possibility of extending chain of the polyoxyalkylenediol so as to obtain optimum molecular weight ranges. Furthermore, the use of allyl chloroformate is a handicap because it is a reagent which is not easy to be found on the market, is extremely toxic and is heat-unstable.

It has now been found that it is quite possible to offset, or at least, drastically to reduce, the shortcomings of the prior art procedures by adopting, as a base for a sealant, the polycarbonate of a polyoxyalkylenediol, as obtained by a simple and convenient procedure.

Thus, an objective of the present invention is to prepare a polycarbonate of a polyoxyalkylenediol-α,ω-bisallyl, which is adapted to be used as a base for sealants. Another objective of the present invention is the preparation of sealants as obtained by functionalizing said polycarbonate of polyoxyalkylenediol-α,ω-bisallyl with an organic compound, especially an organic silicon compound. Still another object of the present invention is to suggest a process for the preparation of said polycarbonate of polyoxyalkylenediol-α,ω-bisallyl.

Other objects of the invention will appear from the description which follows.

More particularly, the polycarbonate of polyoxyalkylenediol-α,ω-bisallyl, which is one of the objectives of the present invention, is a compound which can be defined by the general formula

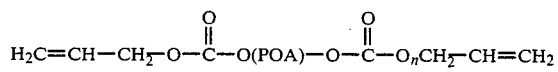

wherein: (POA) is a polyoxyalkylene radical deriving from a polyoxyalkylenediol having a molecular weight of from about 400 to about 4,500; n is an integer variable from about 2 to about 50.

The sealants, which are another object of the present invention, are the reaction product of polycarbonate of polyoxyalkylenediol-α,ω-bisallyl with silylation agents, known in the art and used for that purpose. The process for the preparation of the polycarbononate of polyoxyalkylenediol-α,ω-bisallyl comprise the steps of:

(a) a first reactional stage in which there placed in mutual contact diallylcarbonate and a polyoxyalkylenediol having a molecular weight of from about 400 to about 4,500, in a molar ratio of from 2.5:1 to 10:1, working in the presence of catalytic amounts of a transesterification catalyst, at a temperature equal to or above 100° C. under a reduced pressure which permits to remove by vaporization the allyl alcohol which is a reaction by-product, as it is being formed, but without removing, or without substantially removing by vaporization the unaltered diallylcarbonate, until a complete, or virtually complete, functionalization is achieved of the polyoxyalkylenediol with the attendant formation of the corresponding bisallylcarbonate of said polyoxyalkylenediol according to the reaction pattern:

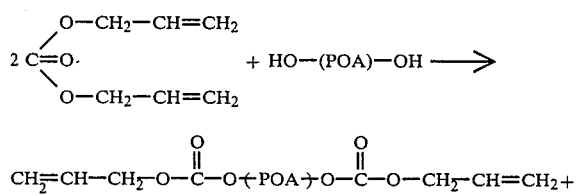

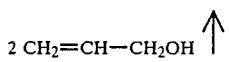

wherein: (POA) is the radical of the polyoxyalkylenediol;

(b) a second reaction stage in which the product which has been obtained in the first stage is subjected to treatment at a temperature of from 70° C. to 150° C. under a pressure equal to or less than about 1 Torr, in the presence of catalytic amounts of said transesterification catalyst, so as to bring about the chain extension of the bisallyl carbonate of the polyoxyalkyleneglycol and to eliminate the diallylcarbonate which comes from the first stage unaltered, in addition to that which is formed as a by-product in the chain-extension reaction, until obtaining a polycarbonate of a polyoxyalkylenediol-α,ω-bisallyl according to the reaction pattern:

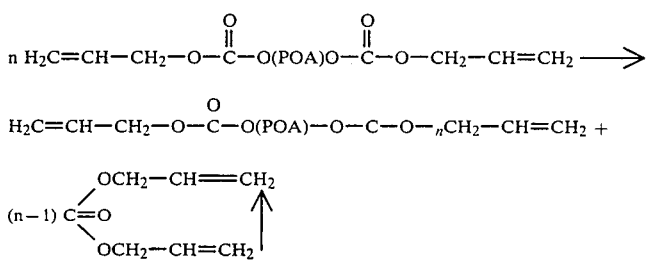

wherein (POA) has the meaning as indicated above and n is an integer the value of which, or the mean value of which, varies from 2 to 50.

The polyoxyalkylenediols which are useful to the purposes of the present invention are appropriately selected from among polyoxyethylenediol, polyoxypropylenediol, polyoxybutylenediol, polyoxyisobutylenediol and polyoxytetramethylenediol, the preferred one out of all them being polyoxypropylenediol. Still more, in the preferred embodiment, a polyoxyalkylenediol is used, which has a molecular weight of from about 1,000 to about 4,000. Preferred from among the transesterification catalysts are the alcoholates of alkali metals, especially sodium methylate, both due to the low cost and because they can readily be removed from the reaction product, for example by reaction with carbon dioxide or merely by washing. Alternatively, these catalysts can be removed by treatment with organic acids or mineral acids, or by having them flowing through sulphonated acidic resins. Other catalyst, though less preferable, are the mineral, the organic and the inorganic acids, the alcoholates of transition metals, also in the form of complexes, such as for example Ti(OR)$_4$ and MgTi(OR)$_6$ wherein R is an organic radical, or metal oxides such as CaO,ZnO,SnO(OR)$_2$, and others, or their combinations.

At any rate, these transesterification catalysts are more expensive than the alkali metal alcoholates and, in addition, they can be removed only with difficulty from the reaction end product.

The quantity of catalyst, which is active for the reaction of formation of the bisallylcarbonate of the polyoxyalkyle nediol generally varies from 0.001% to 0.5% of the reaction mass, the preferred values being in the order of 0.01% on a weight basis.

In the first reaction stage, moreover, an excess of diallylcarbonate is used relative to the amount which is stoichoimetrically required for the formation of the bisallyl carbonate of the polyoxyalkylenediol, the molar ratios which are preferred of the diallyl carbonate to the polyoxyalkylenediol lying in the range from 5:1 to 10:1. The reaction temperatures for the first stage aforesaid are generally comprised between 100° C. and 150° C., the preferred values being in the vicinity of 120° C.

The pressures under which the reaction is conducted are those which allow to remove by vaporization the allyl alcohol byproduct as it is being formed, without removing or without virtually removing the unreacted diallylcarbonate which is present in the reaction medium. Consistently with the temperatures indicated above for the reaction, the corresponding pressures at which the operations can usefully be conducted vary from about 300 Torr to about 50 Torr.

Within the reaction conditions aforementioned, one obtains a complete, or virtually complete, functionalization of the polyoxyalkylenediol by the diallyl carbonate, the reaction times varying generally from 0.5 hours to 3 hours.

In actual practice, the first reaction stage can be regarded as having been completed as the evolution of allyl alcohol, a reaction by-product, is over. At this stage, the second reaction stage can be started, by bringing the pressure within the reactor to values equal to, or lower than, about 1 Torr and by heating to a temperature in the range of from about 70° C. to 150° C. During the second reaction stage, the catalyst as used for the first stage is active within the same concentration range as before.

Under these conditions, the elimination by vaporization of the unreacted diallyl carbonate coming from the first reaction stage is first experienced, whereafter the chain-extension of the bisallyl carbonate of the polyoxyalkylenediol formed in the first stage is experienced, so that additional diallyl carbonate elimination can take place.

The temperatures which are preferred for the second reaction stage lie within the range of from 90° C. to 120° C. The reaction of the second stage is discontinued as the final product has reached the expected molecular weight, which can easily be checked by viscosity readouts. More particularly, the viscosity of the polycarbonate of the polyoxyalkylenediol-α,ω-bisallyl can vary, as a rule, from 2,000 to 1,000,000 centipoises at 25° C., the preferred values being from 5,000 cps to 100,000 cps at 25° C. The times which are required to attain such viscosity values generally vary from 0.5 hours to 5 hours.

The corresponding molecular weights of the polycarbonate of polyoxyalkylenediol-α,ω-bisallyl vary from about 5,000 to about 16,000, the preferred values ranging from 8,000 to 12,000.

On completion of the reaction, the alkali metal alcoholate used as the catalyst for transesterification can be removed by any of the treatments aforementioned and preferably by treatment with carbon dioxide so that one obtains, at any rate, a polycarbonate of polyoxyalkylenediol-α,ω-bisallyl which is functionalized completely or substantially completely, with the allyl groups at the chain ends, the molecular weight being controlled consistently with the reaction conditions, the product being obtained in an extremely pure condition, since the content of residual diallyl carbonate is, in fact, in the order of from 0.1% to 0.3%.

One of the particular advantages of the process according to the present invention is that the catalyst can be employed in a reduced amount (1% and less) so that its removal is no longer necessary, such as is experienced, for example, in the hydrosilylation operations by means of chlorosilanes. As it is no longer necessary to remove the catalyst, the process is simplified and thus becomes economically more attractive.

According to an alternative embodiment of the present invention, in the first reaction stage there is used a copolymer of an alkylene oxide and an allylglycidyl ether is used for partially or totally replacing the polyoxyalkylenediol.

When working under the other conditions described above, it is possible to obtain a final reaction product which is endowed with a higher allyl functionality, as a function of the quantity of allylglycidyl ether introduced in the copolymer.

At any rate, the polycarbonate of the polioxyalkylenediol-α,ω-bisallyl as obtained can be subjected to functionalization with silicon compounds, such as $HSiCl_3$, $H MeSiCl_2$, $HMe_2SiCl$ and such like, wherein Me indicates a methyl radical.

This reaction is generally carried out in the presence of catalyst of the chloroplatinic acid type ($H_2PtCl_6$), or of the peroxide type, at moderate temperatures in the order of magnitude of 60°–100° C.

By so doing, an organic silicon group is introduced in correspondence with every allyl unsaturation of the polycarbonate of the polyoxyalkylenediol-α,ω-bisallyl and very good sealant substances are obtained, which are capable of hardening under environmental moisture conditions. The experimental examples which follow are reported by way of illustration and are nonlimiting for the present invention.

EXAMPLE 1

A 250-ml two necked flak thermostatically controlled to 60° C. and equipped with magnetic bar stirrer, Vigreux column 40-cm in length and Liebig condenser, with a collecting trap which is refrigerated with dry ice (−78° C.), is charged in an atmospheric of anhydrous nitrogen, and in the order given with: polyoxypropylenediol (PPG) having the following specifications:

Molecular weight (Mn): 4,000
Brookfield viscosity at 25° C.: 970 centipoises
Alcoholic hydroxil content: 0.68% by weight (ASTM D-2849 (30–51))
Unsaturation content: 0.081 meq/g (ASTM D-2849 (52–59))
Carbonyl group content: less than <0.005 meq/g (ASTM D-2849 (60–69))
Water content: 150 ppm,
in an amount of 84.5 g (corresponding to 33.8 millimols of hydroxyl groups), diallyl carbonate (DAC) having a purity over 98.5% and containing 0.5% of free allyl alcohol, in an amount of 26.5 g (corresponding to 187 millimols) and sodium methoxide in the form of a 30% solution of solids in methanol, in an amount of 0.4 ml.

Under these conditions, the ratio of the moles of DAC and the number of hydroxyl groups of the PPG is 5.53. At this stage, the flask is evacuated to produce a vacuum of 150 Torr, and the flask is then immersed in an oil bath thermostatically controlled at 120° C. whereupon a vigorous stirring is started. After two hours the allyl alcohol is entirely distilled off and the reaction mixture is maintained with stirring at the temperature and under the pressure specified above for three additional hours. On completion of this time period, there are in the trap 2.8 mls of allyl alcohol, which correspond to 42.5 millimols.

Inasmuch as a part of the allyl alcohol was contained as an impurity in the starting DAC and another portion comes from the DAC/methanol transesterification, methanol having been introduced with the starting catalyst, the following theoretical balance sheet can be dressed:

allyl alcohol which could be theoretically estimated on the basis of the alcoholic hydroxyls of PPG: 33.8 millimols, equal to 2.31 mls.
allyl alcohol contained as an impurity in the DAC (0.5%): 2.32 millimol, equal to 0.15 ml.
allyl alcohol coming from the transesterification of the methanol which had been introduced with the catalyst: 7.0 millimol, equal to 0.48 ml.

The total is thus 43.12 millimol, corresponding to 2.94 mls of allyl alcohol.

Since the allyl alcohol which has been stripped from the reaction flask contains only minimal traces of the high-boiling DAC, the result is that the transesterification stage of the reaction has been completed to the extent of 100% of theory.

On completion of the transesterification stage, the bath temperature is brought to 80° C., the nitrogen atmosphere is restored and the Vigreux column withdrawn and replaced by a simple air condenser to be directly connected to the trap.

The reaction mass is stirred and a vacuum of 0.1 Torr is produced to start the chain-extension stage. During progress of this stage, the chain extension occurs of the bisallylcarbonate of the PPG as obtained in the previous transesterification stage and the evolved DAC is recovered together with the DAC which was present in excess in the first reaction stage.

During the progress of this second stage, the value of the viscosity of the product is checked and the reaction is discontinued after 16 hours, as the end product exhibits the following properties:

molecular weight (Mn): 14,400 (from vapor phase osmometry-VPO measure
molecular weight (M'n): 13,300 (from the number of total unsaturations, less those due to the DAC residue)
functionalization degree (GF): 91%, wherein GF is (M'n:Mn)×100
Brookfield viscosity at 25° C.: 50,000 centipoises
alcoholic hydroxyl content: traces which cannot be quantized.
unsaturation content: 0.170 meq/g
DAC residue: 0.15% by weight (gas liquid Chromotography GLC).

In FIG. 1 (plot A), there is plotted the trend of the viscosity of the product of the reaction (Brookfield, 25° C.) versus the time expressed in hours.

The final product of the reaction can be stripped of the catalyst by adding, at the end of the reaction, dry ice in lumps in the flask until neutral to litmus paper. For many uses, however, this stripping of the catalyst residue is not required.

EXAMPLE 2

The procedure is the same as for Example 1, the only difference being that the chain-extension stage is conducted for 8 hours at 120° C. The viscosity trend for the reaction product is plotted in plot B of FIG. 1. The end product has the following specifications:
molecular weight (Mn): 29,000
molecular weight (M'n): 25,000
functionalization degree (GF): 86.2%
Brookfield viscosity at 25° C.: 170,000 centipoises
unsaturation content: 0.080 meq/g
DAC residue: less than 0.1% by weight

EXAMPLE 3

By adopting the same apparatus and the same procedure as in Example 1, a two-necked 500-ml flask is charged, in the order given, with polyoxypropylenediol (PPG) having the following properties:
molecualr weight (Mn): 3,000
Brookfield viscosity at 25° C.: 600 centipoises
alcoholic hydroxyl content: 1.10% by weight
unsaturation content: 0.05 meq/g
carboxyl group content: less than 0.005 meq/g
water content: 150 ppm
in an amount of 162 g (corresponding to 104.8 millimol of hydroxyl groups), diallylcarbonate (DAC) having a purity over 98.5% and containing 0.5% of free allyl alcohol, in an amount of 72 g (corresponding to 507 millimols) and sodium methoxide in the form of a 30% solution of solids in methanol (weight basis), in an amount of 1.2 ml. Under these conditions, the ratio of the moles of DAC to the number of hydroxyl groups of the PPG is 4.84. The transesterification is carried out just as described in Example 1 and 9.5 mls (139.7 millimols) are collected.

The result is that the reaction is complete, with respect to theory, because the balance sheet for allyl alcohol can theoretically be forecast as follows:
allyl alcohol theoretically estimated on the basis of the content of hydroxyls in the PPG: 7.13 mls (104.8 millimols), allyl alcohol contained as an impurity in the DAC: 0.42 ml (6.2) millimol), allyl alcohol deriving from the transesterification of the methanol which is introduced with the catalyst: 0.84 ml (21.0 millimols).

The total is thus 8.39 msl (132.0 millimol).

The stage of chain-extension of the bisallylcarbonate of the PPG is conducted under a pressure of 0.1 Torr, at 100° C., for 3 hours, and a final product is obtained, which has the following properties:
molecular weight (Mn): 13,100
molecular weight (M'n): 12,000
degree of functionalization (GF): 93.2%
Brookfield viscosity at 25° C.: 29,000 centipoises
unsaturation content: 0.173 meq/g
DAC residue: 0.1% by weight

EXAMPLE 4

A copolymer of the propylene oxide with the allylglycidyl ether, having the following specifications:
molecular weight (Mn): 1,800
Brookfield viscosity at 25° C.: 265 centiposes
alcoholic hydroxyl content: 1.7% by weight
unsaturation content: 0.67 meq/g
water content: less than 150 ppm
and thus containing, as an average, one allyl group per each chain, in an amount of 80 g (80 millimols in terms of alcoholic hydroxyls), is admixed with 84.5 g of the PPG having a molecular weight of 4,000 of Example 1 (33.8 millimols in terms of alcoholic hydroxyls), 80 g of DAC (563 millimols) having the properties set forth in Example 1 and with 1 ml of a 30% solution of sodium methylate in methanol (weight basis). Under these conditions, the ratio of the mols of DAC to the number of hydroxyl groups is 4.95.

The transesterification stage is carried out during 3 hours under the conditions reported in Example 1 and, once that this time has elapsed, there are collected 8.7 mls of allyl alcohol, corresponding to 127.32 millimols. By remaking the material balance sheet similarly to what has been made in Example 1, the results are:
allyl alcohol as can theoretically be forecast on the basis of the alcoholic hydroxyls in the PPG: 113.8 millimols, equal to 7.78 mls;
allyl alcohol contained as an impurity in the DAC: 0.5% by wt; that is 6.88 millimols, equal to 0.47 ml;
allyl alcohol deriving from the transesterification of the methanol introduced with the catalyst: 4.64 millimol, equivalent to 0.30 ml.

The total is thus 125.32 millimols, corresponding to 8.55 mls so that it can be concluded that, within the allowance due to experimental errors, the transesterification is by 100% complete.

At this stage, the bath temperature is raised to 120° C. and the pressure is adjusted to 0.1 Torr and is maintained in these conditions for one hour. Upon cooling, one obtains a final product which has the following specifications:
Brookfield viscosity at 25° C.: 37,500 centipoises
Alcoholic hydroxyl content: not detectable
Unsaturation content: 0.736 meq/g
DAC residue: 0.1% by weight The final product thus obtained exhibits, as an average, a pendant double allyl bond for each chain, in addition to the allylcarbonic function at the chain ends.

EXAMPLE 5

The procedure is the same as disclosed in Example 1, and the reaction is discontinued after 4 hours in the chain-extension stage. A final product is thus obtained, which has the following specifications:
Brookfield viscosity at 25° C.: 11,600 centipoises
unsaturation content: 0.206 meq/g
DAC residue: 0.2% by weight.

A quantity of 96 g of this product (equal to 19.8 meq milliequivalents) in terms of double bonds is treated in a sealed reactor with 8 mls (77 millimols) of the silicon compound $CH_3Cl_2SiH$ (DMCS) and with 0.3 ml of $H_2PtCl_6.4H_2O$ in isopropanol (corresponding to 4 mg of $H_2PtCl_6.4H_2O$). With a vigorous stirring, the resultant solution is maintained at 60° C. for one hour, at 80° C. for the next hour and at 100° C. for three additional hours, when immersing the reactor in a heating bath of appropriate configuration. At the end of the period of time aforesaid, the reaction mixture is cooled to room temperature and the excess DMCS is stripped from the reaction mass. After having placed the mass under an inert gas blanket, there are added, at the outset, 2 mls of methanol and, thereafter, 6 mls of propylene oxide and vigorous stirring is applied.

Within 10 minutes, the reaction mixture is neutral. The bath temperature is now raised to 60° C., the mass is stirred for two hours, whereafter it is subjected to stripping under vacuum to remove methanol and the propylene oxide residues. The residual product is supplemented with 0.96 g (1% by weight) of Sn (nor.butyl) (laurate)$_2$ and 0.48 g (0.5% by weight) of cyclohexylamine.

The product which has been so treated and which exhibits a virtually unaltered viscosity, is spread in film-form to a thickness of 1.25 mm. When exposed to environmental conditions (25° C. and 50% rel. humidity) the film is tack free after 12 hours.

Its gel content after 4 days is 85% and it exhibits values of tensile 5.4 kg/cm$^2$ and an elongation at break of 175%.

We claim:

1. A process for the preparation of a polycarbonate of polyoxyalkylenediol-α,ω-bisallyl, useful as a sealant base, comprising:

(a) a first stage of reaction comprising contacting a diallyl carbonate reactant and a polyoxyalkylenediol reactant having a molecular weight of from about 400 to about 4,500, in a molar ratio of from 2.5:1 to 10:1, and a catalytic amount of a transesterification catalyst, at a temperature equal to or higher than 100° C. and under a reduced pressure which permits the removal by vaporization of the allyl alcohol by-product being formed, without removing or substantially removing by vaporization the unreacted diallyl carbonate, with the formation of the coresponding bisallylcarbonate of said polyoxyalkylenediol having the formula:

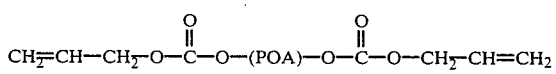

wherein (POA) is the radical of the polyoxyalkylenediol after removal of the terminal hydrogen therefrom, and (b) a second stage reaction in which the bisallyl carbonate product as obtained in the first stage is treated to a temperature of from 70° C. to 150° C. under a pressure equal to or lower than Torr, in contact with a catalytic amount of said transesterification catalyst, so as to cause the chain extension of the bisallylcarbonate of the polyoxyalkylenediol together with the removal of the (1) unreacted bisallyl carbonate from the first stage and (2) diallylcarbonate which is formed as a by-product in the chain-extension reaction, to obtain a polycarbonate of the polyoxyalkylenediol-α,ω-bisallyl having the formula:

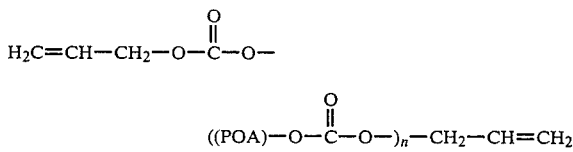

wherein (POA) has the same meaning as indicated above and n is an integer, the value of which, or the mean value of which, varies from 2 to 50.

2. Process according to claim 1 wherein the polyoxyalkylenediol is a member selected from among polyoxyethylenediol, polyoxypropylenediol, polyoxybutylenediol, polyoxyisobutylenediol or polyoxytetramethylenediol.

3. Process according to claim 1, wherein said polyoxyalkylenediol is polyoxypropylenediol.

4. Process according to claim 1 wherein the polyoxyalkylenediol has a molecular weight of from 1,000 to 4,000.

5. Process according to claim 1 wherein the transesterification catalyst is a member selected from among: alcoholates of alkali metals, organic and inorganic mineral acids, alcoholates of transition metals or metal oxides.

6. Process according to claim 5, wherein said transesterification catalyst is an alcoholate of an alkali metal.

7. Process according to claim 6, wherein said alkali metal alcoholate is sodium methylate.

8. Process according to claim 1 wherein the amount of transesterification catalyst is from 0.001% to 0.5% by weight based on the weight of the reactants.

9. Process according to claim 8, wherein the amount of said transesterification catalyst is 0.01% by weight based on the weight of reactants.

10. Process according to claim 1 wherein the molar ratio of the diallylcarbonate to the polyoxyalkylenediol ranges from 5:1 to 10:1.

11. Process according to claim 1 wherein the reaction temperature in the first stage varies from 100° C. to 150° C. and the first stage pressure varies from 300 to 50 Torr.

12. Process according to claim 11, characterized in said reaction temperature is 120° C.

13. Process according to claim 1 wherein the reaction times for the first stage reaction vary from 0.5 hour to 3 hours.

14. Process according to claim 1 wherein the second stage reaction temperature is from 90° C. to 120° C.

15. Process according to claim 1 wherein the second stage reaction uses the same transesterification catalyst as used in the first stage.

16. Process according to claim 1 wherein the second stage reaction polycarbonate has a viscosity of from 2,000 centiposes to 1,000,000 centipoises at 25° C.

17. Process according to claim 16, wherein in said second stage reaction the reaction is carried out until attaining for the reaction product a viscosity of from 5,000 cps to 100,000 cps at 25° C.

18. Process according to claim 1 wherein the second stage reaction continues for a time of from 0.5 hours to 16 hours.

19. Process according to claim 1 wherein in the first stage reaction the polyoxyalkylenediol is partially or totally replaced by a copolymer of alkylene oxide and allylglycidyl ether.

20. Sealant containing the polycarbonate of polyoxyalkylenediol-α,ω-bisallyl as claimed in claim 1.

21. Sealant containing as a base the polycarbonate of polyoxyalkylenediol-α-ω-bisallyl obtained from the process of claim 1.

22. Sealant as defined in claim 21 which includes an amount of a silicon compound selected from the group consisting of HSiCl$_3$; HCH$_3$SiCl$_2$ and H(CH$_3$)$_2$SiCl and an amount of a choroplatinic acid catalyst that are sufficient to harden the composition in the presence of atmospheric moisture.

* * * * *